(No Model.)
H. H. SATER.
CULTIVATOR.
No. 297,637. Patented Apr. 29, 1884.
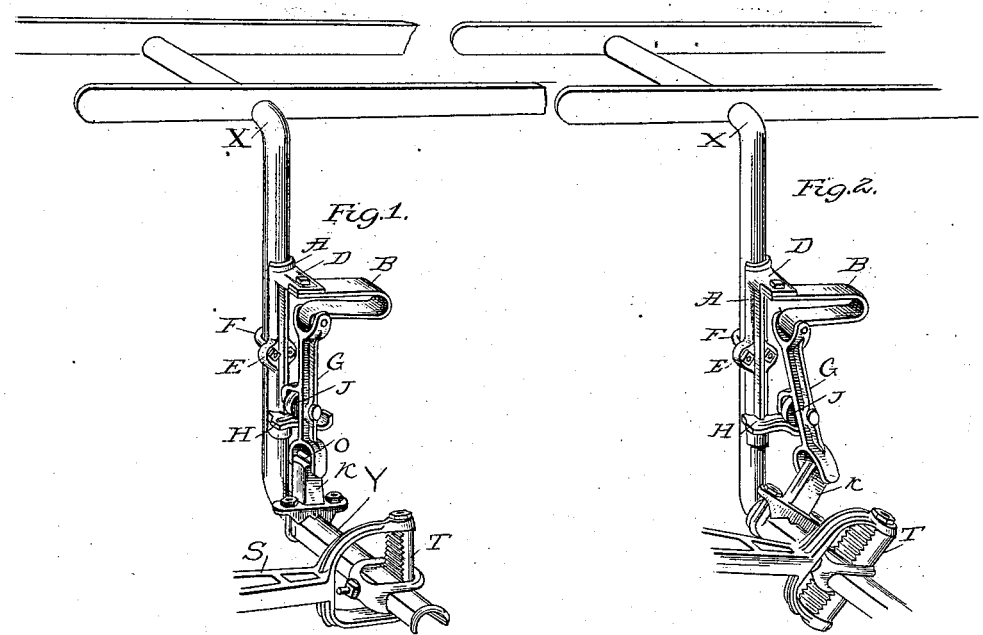
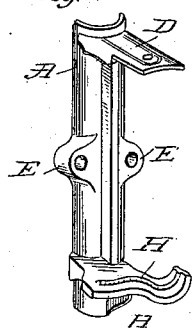
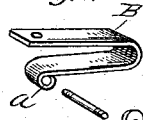
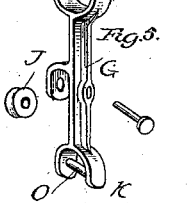
Attest:
Walter Donaldson
L. E. Middleton
Inventor
Hans H. Sater
by
Joyce & Shear
Attys.

UNITED STATES PATENT OFFICE.

HANS H. SATER, OF DUBUQUE, IOWA.

CULTIVATOR.

SPECIFICATION forming part of Letters Patent No. 297,637, dated April 29, 1884.

Application filed August 31, 1883. (No model.)

*To all whom it may concern:*

Be it known that I, HANS H. SATER, of Dubuque, in the county of Dubuque and State of Iowa, have invented a new and useful Improvement in Attachments for Cultivators; and I do hereby declare that the following is a full, clear, and exact description of the same.

My invention relates to attachments for cultivators, the object of which is to hold the shovel-bar either in or out of working position, as desired, and when in working position to hold it in contact with the ground, so that it may cut constantly at the proper depth.

The invention consists in combining with the axles and coupling of the cultivator a joining connection-rod and a spring secured to the arch of the axle; further, in combination with such connecting-rod, spring, and rod, a roller working on the track secured to the arch of the axle; and, further, in various details of construction, all fully hereinafter explained, and illustrated in the accompanying drawings, in which—

Figure 1 is a perspective view of the operation of the axle and arch of the cultivator, and a shovel-bar with my adjustments in the position it assumes when the shovel is on the ground. Fig. 2 is a similar view with shovel-bar elevated. Figs. 3, 4, 5, and 6 represent details; and Fig. 7 is a modified form of the spring.

In these drawings, X represents the arch shape of the cultivator-axle.

Y represents the horizontal extremity of such axle. S represents one of the shovel-bars broken away, and T is a universal-joint coupling connecting the shovel-bar to the axle, permitting it a horizontal and vertical adjustment.

A represents a semi-tubular sleeve, secured by a clamp, F, passing through lugs E E, to the outside of the vertical portion of the arch.

Bolted to a projection, D, extending at right angles from the upper end of the sleeve, is a spring, B, formed by doubling the flat piece of spring metal, as shown, and by forming its lower end into an eye, $a$, all as shown in Fig. 4. The end of the spring in which this eye is formed is connected to a fork on the upper end of the bar G. (Shown in details in Fig. 5.) This bar extends parallel with the vertical part of the arch, and at or about its center is provided with bearings, in which is journaled a roller, J. This roller runs upon a curved track, H', in a plate, H, secured to or forming part of the sleeve A.

At the outer end of the plate H there is a deep depression and an outward curve, which limits the movement of the roller in that direction. The lower end of the bar G is coupled by means of a pin, O, to a standard, K, clamped to the axle-sleeve T of the plow-coupling. The connection of the standard to the axle is formed by indentations, notches, and ribs to the meeting surface, and by making the sleeve of angular form to fit the base of the standard. The standard K thus forms a part of the coupling and shovel-bar, and moves with the same, working on the pin O.

As shown in Fig. 2, the effect of elevating the shovel-bar by the driver through the ordinary means for that purpose is to cause the roller to travel on its track and the standards K and bar G to take a position at an angle to each other. The tension of the spring B thus causes the shovel to remain elevated until forcibly depressed by the lever under the control of the driver.

When the plow is in the ground, the parts assume the position shown in Fig. 1, the tendency of the spring at that time being in the position to hold the plow in opposite position at a regular and uniform depth.

I have shown in Fig. 7 a modified form of spring, in which eyes are formed in both ends and a roller journaled in such eyes.

I do not wish to confine myself to the particular location of this spring-connection in relation to the plow-frame, because there are other classes of devices adapted to be raised or lowered, in which it might be used to an advantage.

I claim as my invention—

1. The combination, with the shovel-bars, of the pivoted standards K, the lever G', the spring secured to the said lever and connected to the frame of the cultivator, and the roller J and its curved track.

2. Combined with the arch of the cultivator, axles, semi-tubular sleeve A, curved track H', in combination with the spring B, secured to said sleeve, the bar G, having a roller, and a pivoted standard, K, connected to the shovel-bars.

3. The combination, with the coupling T and the bars attached thereto, of the standard K, locked to such coupling, the bar G, having forked ends, and the spring B, connected to the semi-tubular sleeve A.

In testimony whereof I have signed my name to this specification in the presence of two subscribing witnesses.

HANS H. SATER.

Witnesses:
ALEX. SIMPLOT,
P. KIENE.